US012799785B2

(12) United States Patent
Anderson et al.

(10) Patent No.: US 12,799,785 B2
(45) Date of Patent: Nov. 17, 2026

(54) LIVING HINGE DOOR CLADDING

(71) Applicant: Rivian IP Holdings, LLC, Irvine, CA (US)

(72) Inventors: Alex Anderson, Escondido, CA (US); David Michael Hilborn, Troy, MI (US); Andrew Benjamin Rocassin, Corona, CA (US); Erik Quintero, Foothill Ranch, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 359 days.

(21) Appl. No.: 18/528,021

(22) Filed: Dec. 4, 2023

(65) Prior Publication Data

US 2025/0179849 A1 Jun. 5, 2025

(51) Int. Cl.
*E05D 1/02* (2006.01)
*B60J 5/04* (2006.01)

(52) U.S. Cl.
CPC .............. *E05D 1/02* (2013.01); *B60J 5/0468* (2013.01); *E05Y 2900/50* (2013.01)

(58) Field of Classification Search
CPC ....... E05D 1/02; B60J 5/0468; E05Y 2900/50
See application file for complete search history.

(56) References Cited

U.S. PATENT DOCUMENTS 7,371,341 B2 * 5/2008 Youngs ............... B29C 45/0017 264/250
7,517,002 B2 * 4/2009 Reed ........................ B60N 3/12 296/146.7
11,472,326 B1 * 10/2022 Nageshkar .............. B60P 1/435
11,801,796 B2 * 10/2023 Croyle .................... B60R 13/04
2025/0026187 A1 * 1/2025 Bryant ................... B60J 5/0401

* cited by examiner

*Primary Examiner* — Faye M Fleming
(74) *Attorney, Agent, or Firm* — Foley & Lardner LLP

(57) ABSTRACT

Aspects of the present disclosure related to a vehicle cladding. The cladding includes a first portion, a second portion, and a living hinge formed between the first portion and the second portion thereby forming a monolithic structure. The first portion and the second portion are operable to couple to opposing sides of a vehicle component.

20 Claims, 6 Drawing Sheets

LIVING HINGE DOOR CLADDING

INTRODUCTION

Claddings are important elements applied to various vehicle components, such as vehicle doors. Generally, a vehicle door cladding may conceal an edge of the vehicle door and/or various openings in the vehicle door (e.g., sealant holes or drain holes). However, claddings may increase manufacturing costs and assembly time of the vehicle components on which claddings are implemented.

SUMMARY OF THE INVENTION

The present disclosure generally relates to vehicle components, and more specifically, to a vehicle cladding.

In one or more embodiments, a cladding is disclosed. The cladding includes a first portion, a second portion, and a living hinge formed between the first portion and the second portion thereby forming a monolithic structure. The first portion and the second portion are operable to couple to opposing sides of a vehicle component.

In one or more embodiments, a method of forming a cladding is disclosed. The method includes activating a first set of gates to inject a first polymer portion into a mold. The method further includes, after a first time period has elapsed after activating the first set of gates, activating a second set of gates to inject a second polymer portion into the mold. The method further includes, after a second time period has elapsed after activating the second set of gates, activating a third set of gates to inject a third polymer portion into the mold. The first polymer portion, the second polymer portion, and the third polymer portion flow through the mold to form a monolithic structure having a living hinge, and a continuous section having greater than 50% of a length of the living hinge is formed from one of the first polymer portion, the second polymer portion, or the third polymer portion.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting in scope, and may admit to other equally effective embodiments.

DETAILED DESCRIPTION

Figure 1:
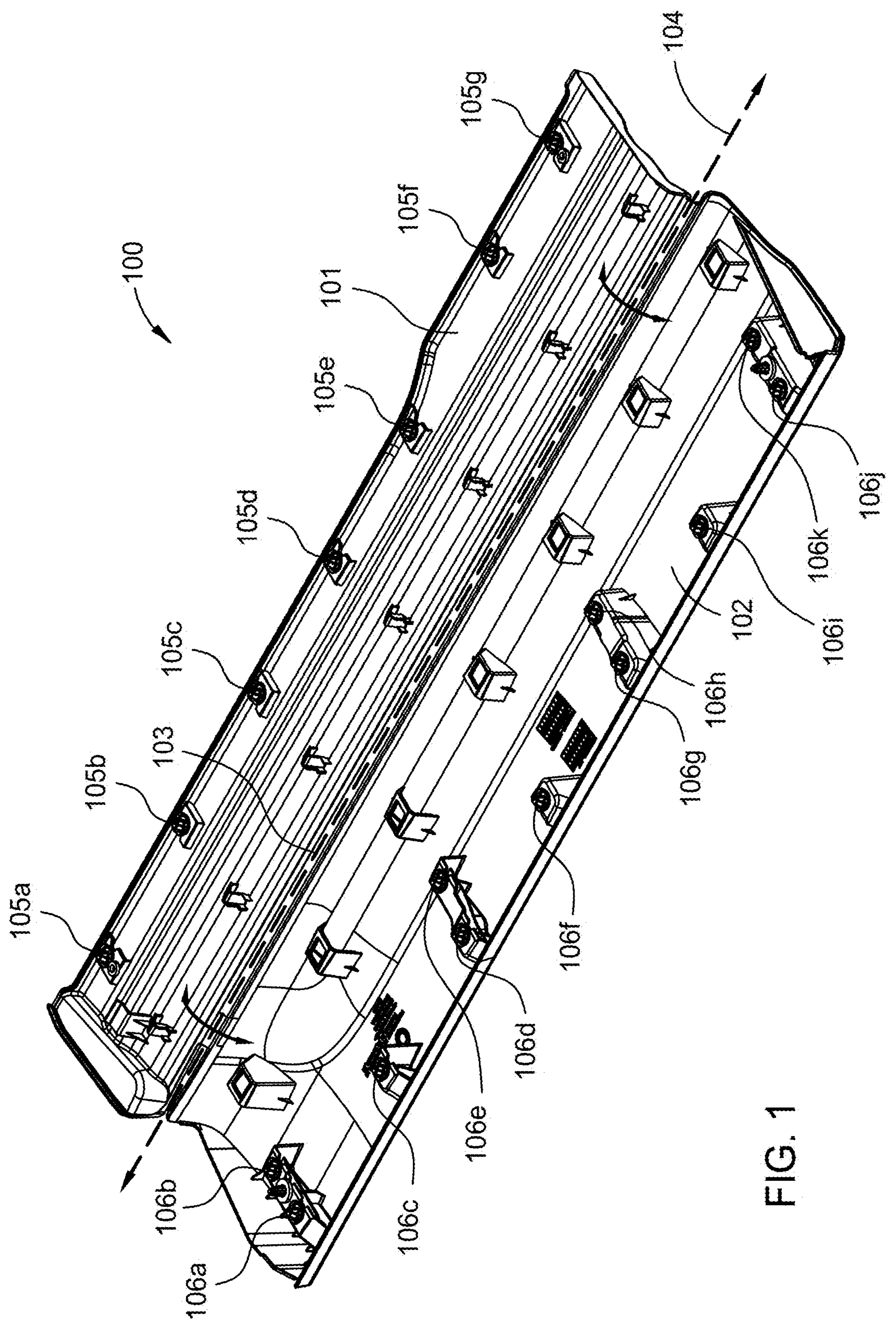
FIG. 1 illustrates an example cladding according to certain embodiments.

It is to be understood that the following disclosure provides many different embodiments, or examples, for implementing different features of various embodiments. Specific examples of components and arrangements are described below to simplify the disclosure. These are, of course, merely examples and are not intended to be limiting. The section headings used herein are for organizational purposes and are not to be construed as limiting the subject matter described.

Claddings are important elements applied to various vehicle components, such as vehicle doors. Generally, a vehicle door cladding conceals the stamping hem edge of the vehicle door and/or various openings in the vehicle door (e.g., sealant holes or drain holes). However, claddings generally include multiple parts which may increase costs associated with manufacturing and assembly of the vehicle door. Certain embodiments described herein provide a more efficient and/or cost effective cladding.

In particular, certain embodiments relate to a cladding for a vehicle component (e.g., a vehicle door) that implements a living hinge design. The living hinge design conceals the stamping hem edge of the door and/or various openings in the door (e.g., sealant holes or drain holes) and reduces costs associated with manufacturing and assembly of the vehicle door.

In certain embodiments, the cladding is composed of a first portion and a second portion. A living hinge is formed between the first portion and the second portion thereby forming a monolithic structure. The first portion and the second portion are operable to couple to opposing sides of a vehicle component.

In certain embodiments, the vehicle component is a door that has an interior surface and an exterior surface. The first portion has a first set of couplings operable to couple to the interior surface of the door, and the second portion has a second set of coupling operable to couple to the exterior surface of the door. In certain embodiments, the first and/or second set of couplings include snap-fit connectors. The interior surface and/or the exterior surface may include a stamped metal surface, where the first and/or second set of couplings couple to one or more holes (e.g., locating holes) formed in the stamped metal surface.

When the first portion and the second portion are in a folded configuration, the first portion is coupled to the interior surface, and the second portion is coupled to the exterior surface, such that the first and second portions enclose a bottom portion of the door to cover, for example, door hems, drain holes, and/or sealant holes.

In various embodiments, the monolithic structure of the cladding is made from a polymer (e.g., expanded polyolefin, a thermoplastic polyolefin, polypropylene, etc.) which has polymer chains that traverse the living hinge and are aligned in a direction that is substantially perpendicular to a principal axis of the living hinge. This orientation of the polymer chains improves the strength and durability of the living hinge and is enabled by the injection molding techniques described below in conjunction with FIGS. 3 and 4A-4C. Additionally and/or alternatively, the injection molding techniques may be implemented to form a living hinge that is substantially free of weld lines along the length of the living hinge.

In general, the techniques described herein provide more efficient and/or cost effective claddings for vehicle doors while also providing a premium look and increased durability.

FIG. 1 illustrates an example cladding 100 according to certain embodiments. As shown in FIG. 1, cladding 100 includes a first portion 101 and a second portion 102. Living hinge 103 is formed between the first portion 101 and the second portion 102, thereby forming a monolithic structure. In certain embodiments, the first portion 101 and the second portion 102 are operable to couple to opposing sides of a vehicle component, for example, a vehicle door.

In some embodiments, the monolithic structure (e.g., the first portion 101, the second portion 102, and the living hinge 103) forming the cladding 100 is composed of a polymer. In certain embodiments, the polymer may include, without limitation, an expanded polyolefin, a thermoplastic polyolefin, polypropylene, and combinations of the same and like. In some embodiments, polymer chains of the polymer that traverse the living hinge 103 are aligned in a direction that is substantially perpendicular to a principal axis 104 of the living hinge 103. In certain embodiments, the monolithic structure may be formed by injection molding. In some embodiments, the living hinge 103 may be substantially free from weld lines along the length of the living hinge 103.

As shown in FIG. 1, the first portion 101 includes a first set of couplings 105*a-g*, collectively referred to as the first set of couplings 105. The second portion 102 includes a second set of couplings 106*a-k*, collectively referred to as the second set of couplings 106. In some embodiments, the first set of couplings 105 and/or the second set of couplings 106 may be operable to couple to the vehicle component. The first set of couplings 105 and/or the second set of couplings 106 may include, without limitation, snap-fit connectors, press-fit connectors, bayonet connectors, latch connectors, threaded fasteners, magnetic connectors, hook and loop fasteners, tongue-and-groove connectors, and combinations of the same and like. In some embodiments, the first set of couplings 105 and/or the second set of couplings 106 may include snap-fit connectors such as, for example, annular, cantilever, and/or torsional snap-fit connectors. While FIG. 1 illustrates the first portion 101 as having seven couplings (105*a-g*) in the first set of couplings 105 and the second portion 102 having eleven couplings (106*a-k*) in the second set of couplings 106, each of the first set of couplings 105 and/or the second set of couplings 106 may include any number of couplings.

In certain embodiments, during assembly (e.g., assembly of a vehicle door), the first portion 101 is operable to be folded towards the second portion 102 along the principal axis 104 of the living hinge 103. Alternatively, the second portion 102 may be operable to be folded towards the first portion 101 along the principal axis 104 of the living hinge 103.

Figure 2A:
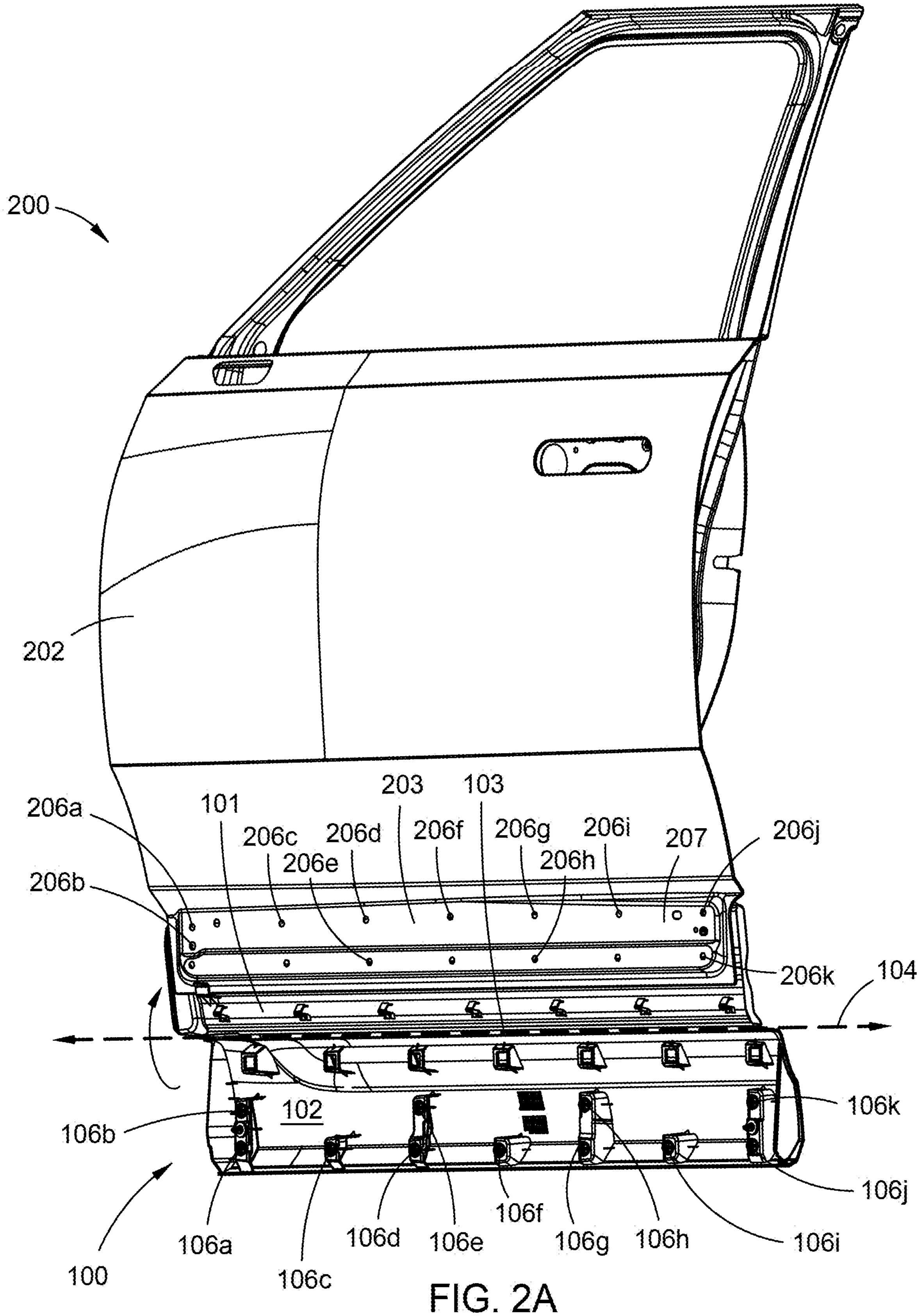
FIG. 2A illustrates the cladding of FIG. 1 coupled to an interior surface of a door according to certain embodiments.
Figure 2B:
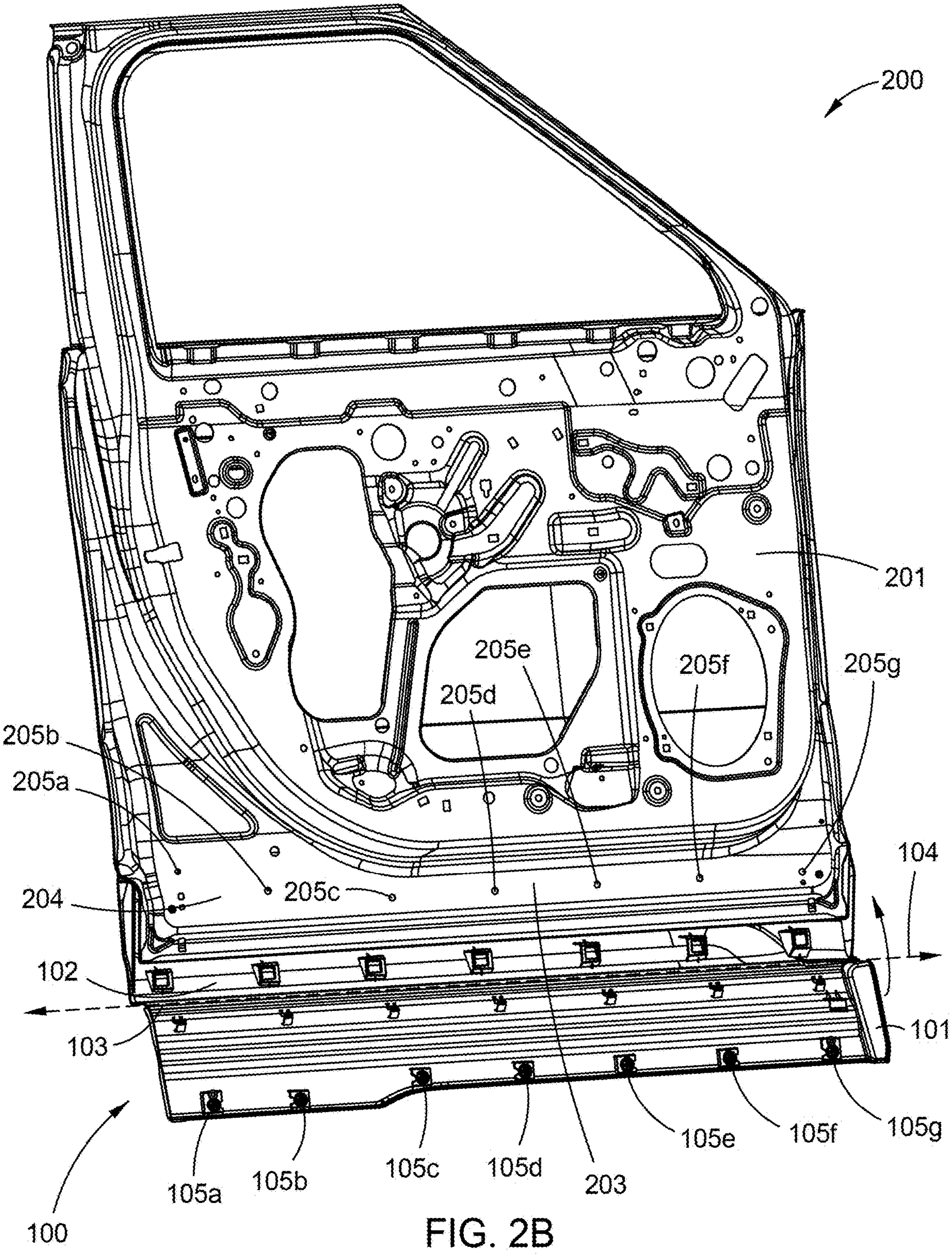
FIG. 2B illustrates the cladding of FIG. 1 coupled to an exterior surface of the door according to certain embodiments.
Figure 2C:
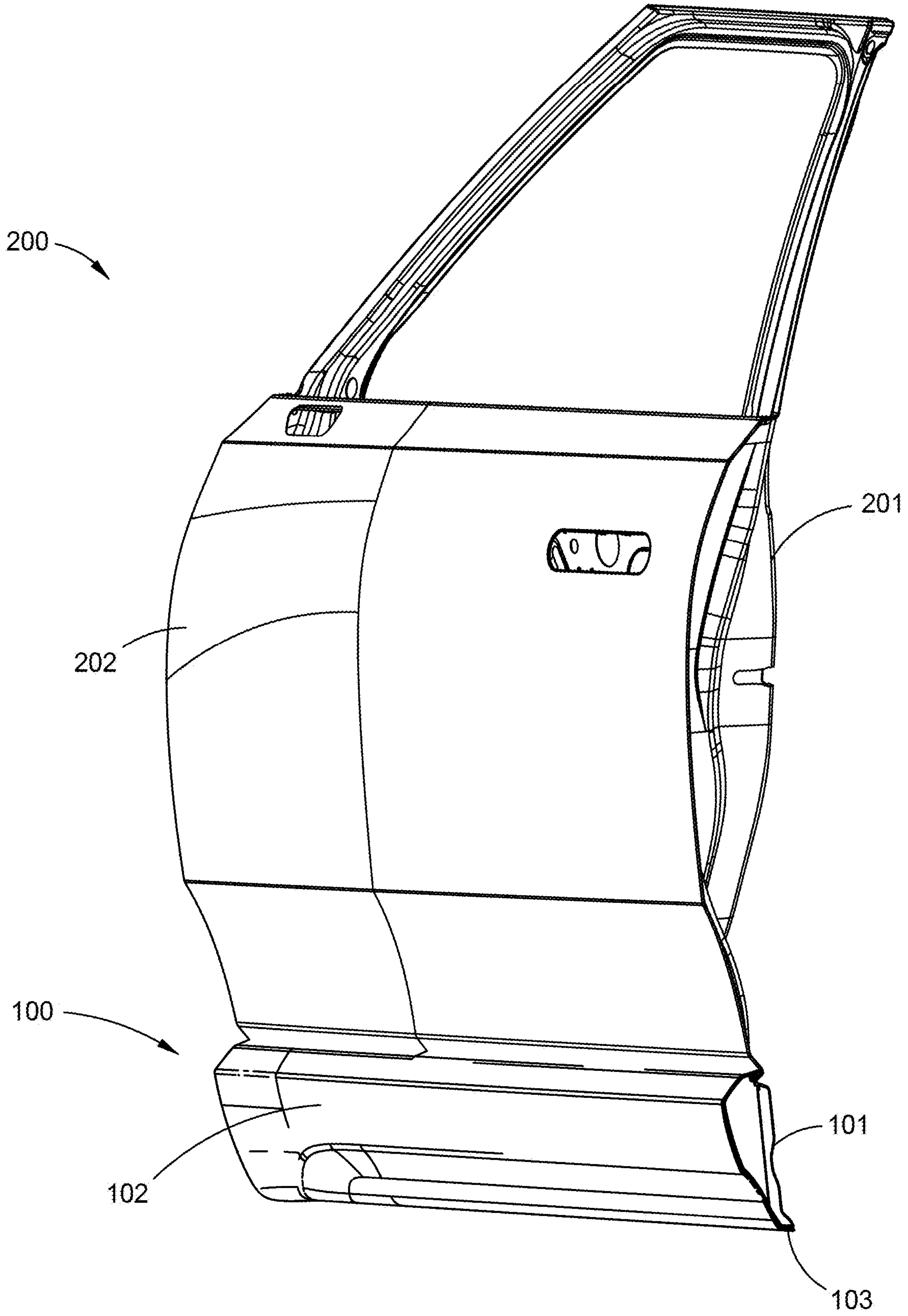
FIG. 2C illustrates the cladding of FIG. 1 in a folded configuration enclosing a bottom portion of the door according to certain embodiments.

FIG. 2A illustrates the cladding 100 coupled to an interior surface 201 of a door 200 according to certain embodiments. FIG. 2B illustrates the cladding 100 coupled to an exterior surface 202 of the door 200 according to certain embodiments. FIG. 2C illustrates the cladding 100 in a folded configuration enclosing a bottom portion 203 of the door 200 according to certain embodiments. FIGS. 2A-C are described together for clarity. The door 200 includes an interior surface 201 and an exterior surface 202.

As shown in FIG. 2B, the interior surface 201 includes a first corresponding set of couplings 205*a-g*, collectively referred to as the first corresponding set of couplings 205. Further, as shown in FIG. 2A, the exterior surface 202 may include a second corresponding set of couplings 206*a-k*, collectively referred to as the second corresponding set of couplings 206. The first corresponding set of couplings 205 is operable to receive the first set of couplings 105, and the second corresponding set of couplings 206 is operable to receive the second set of couplings 106. As described above, the first corresponding set of couplings 205 may be formed on a first stamped metal surface 204 of the door 200, and the second corresponding set of couplings 206 may be formed on a second stamped metal surface 207 of the door 200. In various embodiments, the first corresponding set of couplings 205 and the second corresponding set of couplings 206 include holes, such as locating holes, that are configured to receive the first set of couplings 105 and the second set of couplings 106, respectively, which may include snap-fit connectors.

As illustrated in FIG. 2C, the first portion 101 may be coupled to the interior surface 201 of the door 200, the second portion 102 may be coupled to the exterior surface 202 of the door 200, and the first portion 101 and the second portion 102 may enclose a bottom portion 203 of the door 200. In certain embodiments, the first portion 101 and/or the second portion 102 may cover, for example, a door hem, a drain hole, a sealant hole, and combinations of the same and like. In some embodiments, the living hinge 103 covers a bottom side of the door 200, the first portion 101 covers the interior surface 201 of the door 200, and the second portion 102 covers the exterior surface 202 of the door 200.

Figure 3:
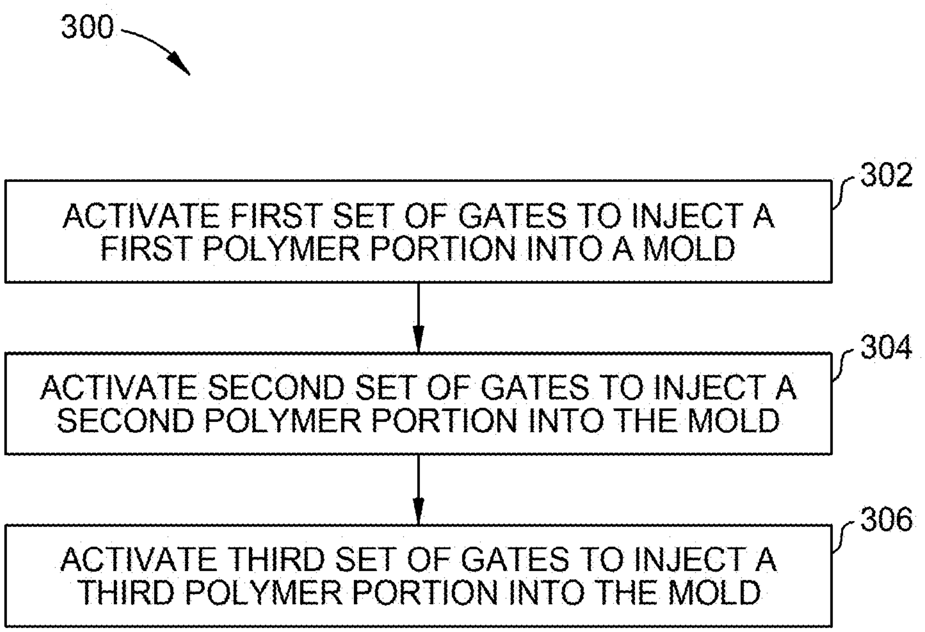
FIG. 3 illustrates an example injection molding method according to certain embodiments.
Figure 4A:
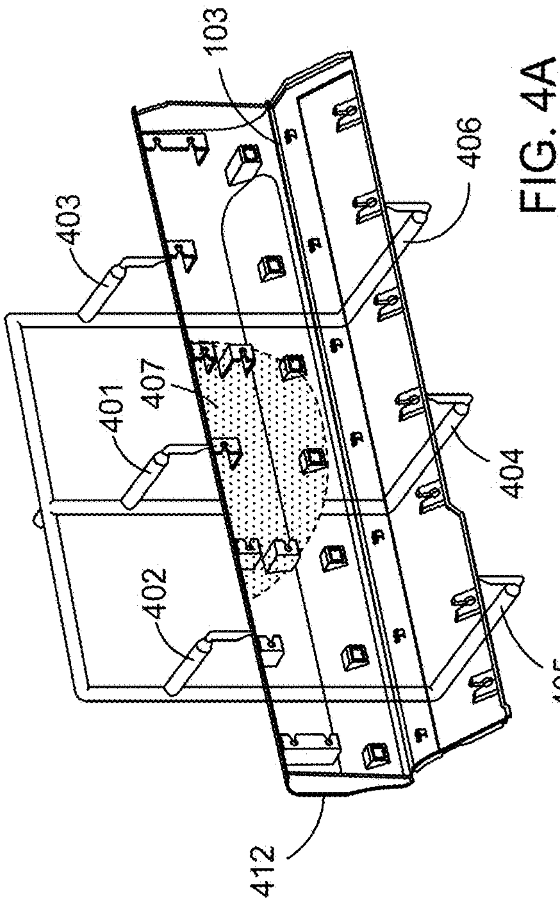
FIG. 4A illustrates a flow of polymer within a mold after a first set of gates is activated using the injection mold method of FIG. 3 according to certain embodiments.
Figure 4C:
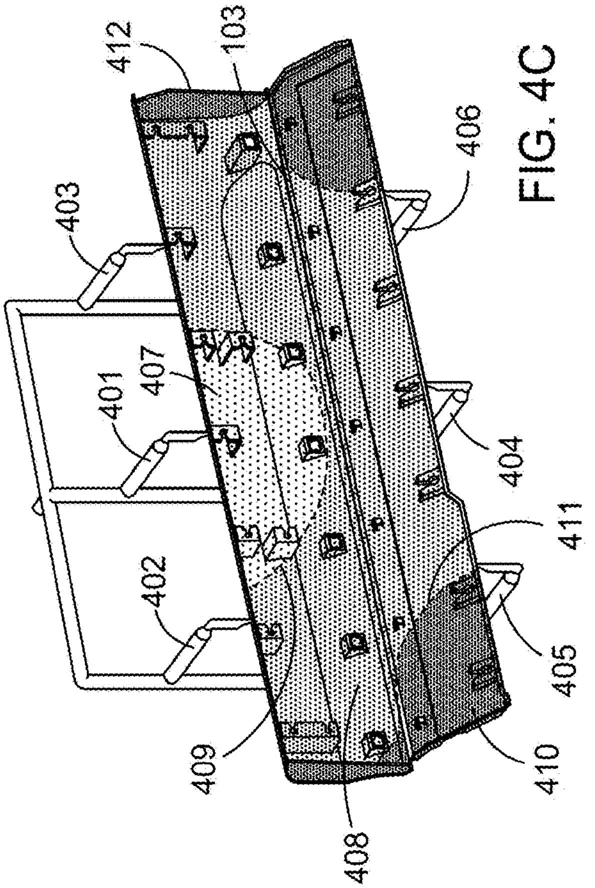
FIG. 4C illustrates a flow of polymer within the mold after a third set of gates is activated using the injection mold method of FIG. 3 according to certain embodiments.
Figure 4B:
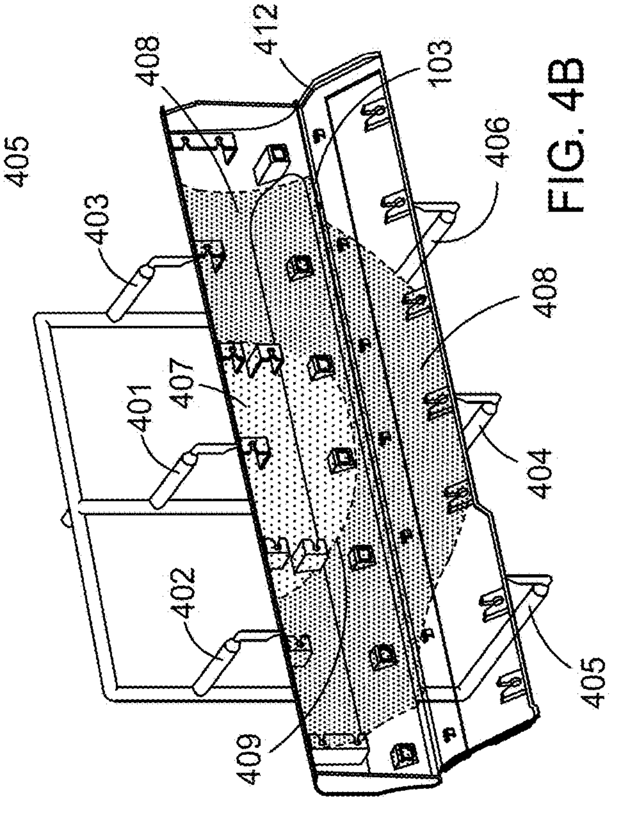
FIG. 4B illustrates a flow of polymer within the mold after a second set of gates is activated using the injection mold method of FIG. 3 according to certain embodiments.

FIG. 3 illustrates an example injection molding method 300 to form a cladding (e.g., cladding 100) according to certain embodiments. FIGS. 4A-C illustrate the flow of a polymer within a mold 412 over different periods of time using the injection molding method 300 according to certain embodiments. FIGS. 3 and 4A-C are described together for clarity.

In certain embodiments, multiple sets of gates, each set of gates having one or more gates, may be activated to flow the polymer through the mold 412 to form the cladding 100. Multiple gates may be utilized in injection molding method 300 to uniformly dispense the polymer through the mold 412 and ensure that the polymer reaches each portion of the mold 412 when forming the cladding 100. In various embodiments, implementing multiple gates when injection molding the cladding 100 may enable the formation of weld lines (e.g., which may be formed when a portion of polymer injected via one gate meets a portion of polymer injected via another gate) to be better controlled. For example, as described below in further detail, the sets of gates may be activated in an order and with a time delay that produces a living hinge 103 that is substantially free of weld lines along the length of the living hinge 103. Additionally and/or alternatively, in certain embodiments, the injection molding method 300 is implemented to form a cladding 100 in which portions of the polymer that traverse the living hinge 103 have polymer chains that are aligned in a direction that is substantially perpendicular to the principal axis 104 of the living hinge 103.

At step 302, a first set of gates is activated to inject a first polymer portion 407 into the mold 412. For example, as shown in FIG. 4A, the first set of gates may include gate 401, where the first polymer portion 407 is injected into the mold 412 upon activation of the gate 401.

At step 304, after a first period of time has elapsed since the first set of gates was activated, a second set of gates is activated to inject a second polymer portion 408 into the mold 412. For example, as shown in FIG. 4B, the second set of gates may include gates 402, 403, and 404, where the second polymer portion 408 is injected into the mold 412 upon activation of gates 402, 403, and 404. When the second polymer portion 408 contacts the first polymer portion 407, a first weld line 409 is formed along the line of contact. As shown in FIG. 4B, the first weld line 409 does not traverse the living hinge 103. In some embodiments, the first period of time may be about 1 to 4 seconds after the first set of gates is activated at step 302. In certain embodiments, gates of the second set of gates (e.g., 402, 403, and 404) may be on opposing sides of an area where the living hinge 103 is formed.

At step 306, after a second period of time has elapsed since the second set of gates was activated, a third set of gates is activated to inject a third polymer portion 410 into the mold 412. As shown in FIG. 4C, the third set of gates includes gates 405 and 406, where the third polymer portion 410 is injected into the mold 412 upon activation of the gates 405 and 406. When the third polymer portion 410 contacts the second polymer portion 408, a second weld line 411 is formed along the line of contact. In some embodiments, the second period of time may be about 2 to 5 seconds after the second set of gates is activated at step 302. In certain embodiments, gates of the third set of gates (e.g., 405 and 406) may be on opposing sides of an area where the living hinge 103 is formed. In certain embodiments, gates of the third set of gates may be on an opposing side of the first set of gates and/or a portion of the second set of gates.

As illustrated in FIG. 4C, most of the length of the living hinge 103 is formed via the second polymer portion 408, significantly reducing the presence of weld lines (e.g., weld lines 109 and 411) along the living hinge 103. In some embodiments, a continuous section comprising greater than 50% of the length of the living hinge 103 is formed via the second polymer and/or is otherwise free of weld lines, such as greater than 60%, such as greater than 70%, such as greater than 80%, such as greater than 90%. Accordingly, in various embodiments, each of the first set of gates, the second set of gates, and the third set of gates is activated such that the first polymer portion, the second polymer portion, and the third polymer portion flow through the mold to form a monolithic structure having substantially no weld lines extending across or along a living hinge portion of the cladding 100. While the injection molding method 300 is described with respect to three sets of gates, certain embodiments may include fewer or more sets of gates without deviating from the scope of this disclosure.

Although various embodiments of the present disclosure have been illustrated in the accompanying Drawings and described in the foregoing Detailed Description, it will be understood that the present disclosure is not limited to the embodiments disclosed herein, but is capable of numerous rearrangements, modifications, and substitutions without departing from the spirit of the disclosure as set forth herein.

The term "substantially" is defined as largely but not necessarily wholly what is specified, as understood by a person of ordinary skill in the art. In any disclosed embodiment, the terms "substantially", "approximately", "generally", and "about" may be substituted with "within [a percentage] of" what is specified, where the percentage includes 0.1, 1, 5, and 10 percent.

The foregoing outlines features of several embodiments so that those of ordinary skill in the art may better understand the aspects of the disclosure. Those of ordinary skill in the art should appreciate that they may readily use the disclosure as a basis for designing or modifying other processes and structures for carrying out the same purposes and/or achieving the same advantages of the embodiments introduced herein. Those of ordinary skill in the art should also realize that such equivalent constructions do not depart from the spirit and scope of the disclosure, and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a", "an", and other singular terms are intended to include the plural forms thereof unless specifically excluded.

Conditional language used herein, such as, among others, "can", "might", "may", "e.g.", and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements, and/or states are in any way required for one or more embodiments.

While the above detailed description has shown, described, and pointed out novel features as applied to various embodiments, it will be understood that various omissions, substitutions, and changes in the form and details of the embodiments illustrated can be made without departing from the spirit of the disclosure. As will be recognized, the various embodiments described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A cladding, comprising:

a first portion;

a second portion; and a living hinge formed between the first portion and the second portion thereby forming a monolithic structure, wherein the first portion and the second portion are operable to couple to opposing sides of a vehicle component, the opposing sides comprising an interior surface and an exterior surface, wherein the first portion is operable to couple to the interior surface and the second portion is operable to couple to the exterior surface.

2. The cladding of claim 1, wherein:

the vehicle component is a door;

the first portion comprises a first set of couplings operable to couple to the interior surface; and the second portion comprises a second set of couplings operable to couple to the exterior surface.

3. The cladding of claim 2, wherein, when the cladding is coupled to the door:

the first portion is folded towards the second portion along the living hinge;

the first portion is coupled to the interior surface of the door; and the second portion is coupled to the exterior surface of the door.

4. The cladding of claim 3, wherein at least one of the first portion or the second portion covers at least one of a door hem, a drain hole, or a sealant hole.

5. The cladding of claim 2, wherein:

at least one of the interior surface or the exterior surface comprises a stamped metal surface; and at least one of the first set of couplings or the second set of couplings couples to the stamped metal surface.

6. The cladding of claim 2, wherein:

the monolithic structure comprises a polymer; and polymer chains of the polymer that traverse the living hinge are aligned in a direction that is substantially perpendicular to a principal axis of the living hinge.

7. The cladding of claim 1, wherein the interior surface comprises a surface facing toward an interior of the vehicle.

8. The cladding of claim 2, wherein at least one of the first set of couplings or the second set of couplings comprises a snap-fit connector.

9. The cladding of claim 2, wherein the first portion and the second portion enclose a bottom portion of the door.

10. The cladding of claim 9, wherein:

the living hinge covers a bottom side of the door;

the first portion covers the interior surface of the door; and the second portion covers the exterior surface of the door.

11. The cladding of claim 1, wherein the living hinge is substantially free of weld lines.

12. The cladding of claim 1, wherein the monolithic structure is injection molded.

13. A method of forming a cladding, the method comprising:

activating a first set of gates to inject a first polymer portion into a mold;

after a first time period has elapsed after activating the first set of gates, activating a second set of gates to inject a second polymer portion into the mold; and after a second time period has elapsed after activating the second set of gates, activating a third set of gates to inject a third polymer portion into the mold, wherein the first polymer portion, the second polymer portion, and the third polymer portion flow through the mold to form a monolithic structure comprising a living hinge, and a continuous section comprising greater than 50% of a length of the living hinge is formed from one of the first polymer portion, the second polymer portion, or the third polymer portion.

14. The method of claim 13, wherein the continuous section is formed from the second polymer portion.

15. The method of claim 13, wherein the continuous section comprises at least 80% of the length of the living hinge.

16. The method of claim 13, wherein gates of the second set of gates are on opposing sides of an area where the living hinge is formed.

17. The method of claim 16, wherein the second time period is longer than the first time period.

18. The method of claim 13, wherein polymer chains of at least one of the first polymer portion, the second polymer portion, or the third polymer portion traverse and align in a direction that is substantially perpendicular to a principal axis of the living hinge.

19. The method of claim 13, wherein the first set of gates is positioned between at least two gates included in the second set of gates.

20. The method of claim 19, wherein at least one gate included in the second set of gates is positioned between at least two gates included in the third set of gates.

* * * * *